US012589440B2

(12) United States Patent
Pham et al.

(10) Patent No.: US 12,589,440 B2
(45) Date of Patent: Mar. 31, 2026

(54) GRIPPING DEVICE FOR HOLDING, CENTRING AND/OR COLLET-CLAMPING A MICROMECHANICAL OR HOROLOGICAL COMPONENT, AND ASSOCIATED ATTACHMENT METHOD

(71) Applicant: ETA SA MANUFACTURE HORLOGÈRE SUISSE, Grenchen (CH)

(72) Inventors: Patric Pham, Utzenstorf (CH); Christophe Donzé, Pieterlen (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 150 days.

(21) Appl. No.: 18/455,863

(22) Filed: Aug. 25, 2023

(65) Prior Publication Data

US 2024/0165715 A1     May 23, 2024

(30) Foreign Application Priority Data

Nov. 17, 2022     (EP) .................................... 22207998

(51) Int. Cl.
  *B23B 31/20*          (2006.01)
  *B23B 31/30*          (2006.01)
  (Continued)

(52) U.S. Cl.
  CPC ........ *B23B 31/202* (2013.01); *B23B 31/2012* (2021.01); *B23B 31/307* (2013.01);
  (Continued)

(58) Field of Classification Search
  CPC ........... Y10T 279/17521; Y10T 279/11; Y10T 279/29; Y10T 279/17299–17376;
  (Continued)

(56) References Cited

U.S. PATENT DOCUMENTS 7,429,049 B2      9/2008   Kramer
7,971,883 B2 *    7/2011   Soroka ................. B23Q 1/0072
                                                         279/43.4

(Continued)

FOREIGN PATENT DOCUMENTS

CH          670780 A5 *  7/1989
CH          712529 A2 * 12/2017
(Continued)

OTHER PUBLICATIONS

Machine Translation of JP 2012-179699 A, which JP '699 was published Sep. 20, 2012.*
European Search Report for 22 20 7998, dated Mar. 30, 2023.

*Primary Examiner* — Erica E Cadugan
(74) *Attorney, Agent, or Firm* — Sughrue Mion, PLLC

(57)          ABSTRACT

A gripping device (100) for holding, centring and/or clamping a micromechanical or horological component (200) in a chamber delimited by a collet including at least one movable jaw (2) and at least one stationary jaw (3), wherein some of the movable jaws (2) and/or stationary jaws (3) include a reference surface (20) to support a component (200) bearing frontally thereagainst, and the gripping device (100) includes both, on the one hand, stationary jaws (3) including the reference surface (20) to support the component (200) bearing thereagainst, and movable jaws (2) for centring and/or clamping the component (200), and on the other hand a vacuum generator (60) for creating the vacuum in the clamping chamber. Also a related method.

15 Claims, 6 Drawing Sheets

(51) Int. Cl.
*B23Q 3/06*      (2006.01)
*G04D 1/00*      (2006.01)

(52) U.S. Cl.
CPC ...... *B23Q 3/067* (2013.01); *B23B 2231/2027* (2013.01); *B23B 2231/2075* (2013.01); *B23B 2231/56* (2021.01); *B23B 2270/12* (2013.01); *G04D 1/0078* (2013.01); *Y10T 279/11* (2015.01); *Y10T 279/17341* (2015.01); *Y10T 279/29* (2015.01); *Y10T 409/303752* (2015.01)

(58) Field of Classification Search
CPC ....................... Y10T 279/17418–17444; Y10T 409/303752–303808; B23B 31/2012; B23B 2231/2075; B23B 31/307; B23B 2231/56; B23B 31/20–31/208; B23B 2231/20–2097; B23B 2260/042; G04D 1/0078; G04D 1/0085; G04D 1/00; B23Q 3/067

See application file for complete search history.

(56) References Cited

U.S. PATENT DOCUMENTS

| | | | |
|---|---|---|---|
| 2005/0248103 A1* | 11/2005 | Kramer | ................. B23B 31/208 |
| | | | 279/43 |
| 2016/0089793 A1 | 3/2016 | Truebenbach | |
| 2021/0078082 A1 | 3/2021 | Maurer | |
| 2024/0165714 A1* | 5/2024 | Pham | ...................... B23B 31/20 |
| 2024/0168441 A1* | 5/2024 | Pham | ................... B23B 31/307 |

FOREIGN PATENT DOCUMENTS

| | | | |
|---|---|---|---|
| CN | 108927822 A | | 12/2018 |
| CN | 113043314 A | | 3/2021 |
| EP | 1 602 426 B1 | | 10/2013 |
| JP | 2005-319580 A | | 11/2005 |
| JP | 2012-179699 A | * | 9/2012 |
| JP | 2021-41528 A | | 3/2021 |
| KR | 10-1352868 B1 | | 1/2014 |

\* cited by examiner

Fig. 10
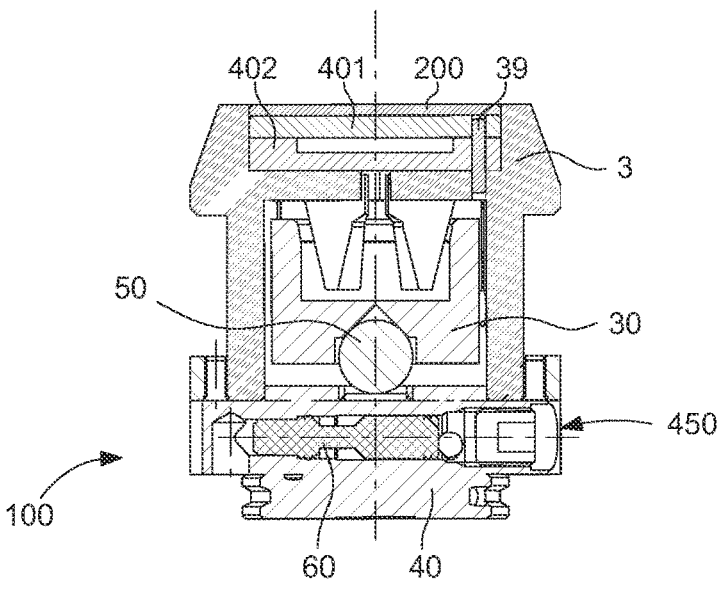
Fig. 11
Fig. 12
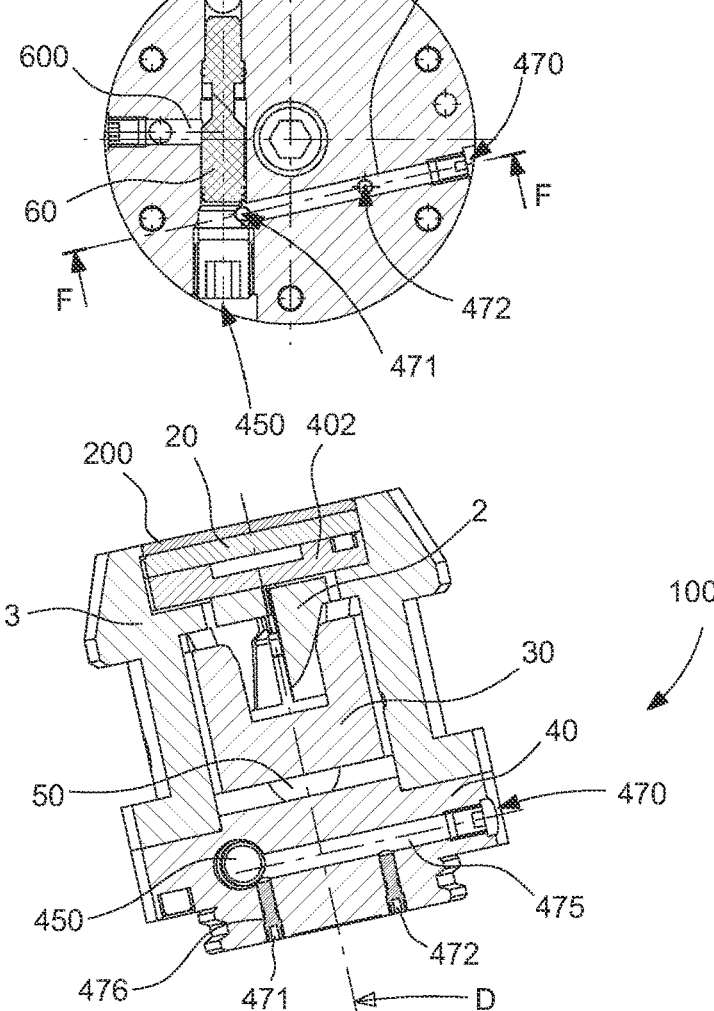

Fig. 13                                    Fig. 14
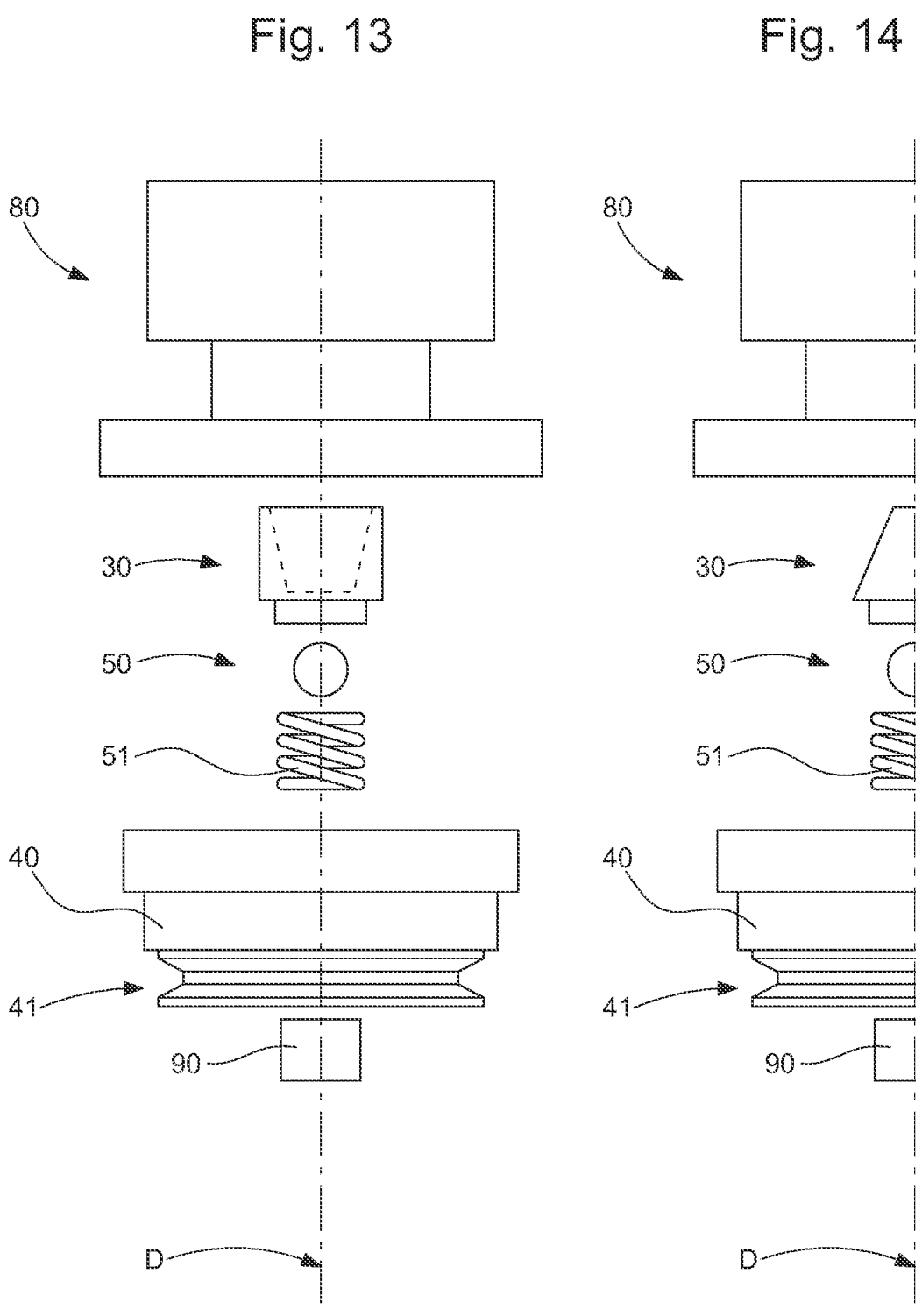

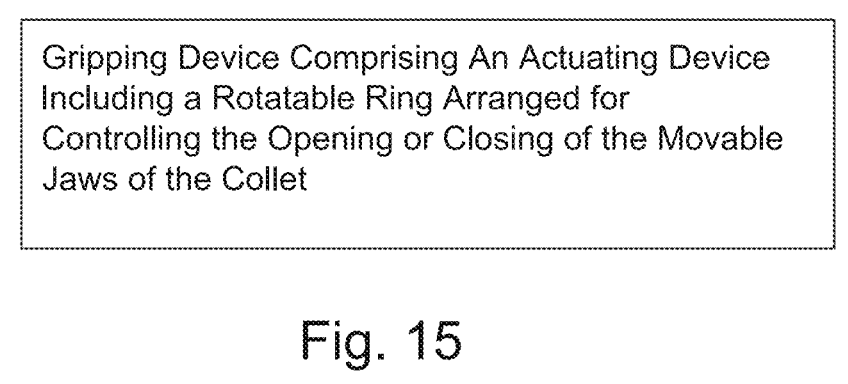

Gripping Device Comprising An Actuating Device Including a Rotatable Ring Arranged for Controlling the Opening or Closing of the Movable Jaws of the Collet

Fig. 15

GRIPPING DEVICE FOR HOLDING, CENTRING AND/OR COLLET-CLAMPING A MICROMECHANICAL OR HOROLOGICAL COMPONENT, AND ASSOCIATED ATTACHMENT METHOD

CROSS REFERENCE TO RELATED APPLICATIONS

This application claims priority to European Patent Application No. 22207998.0 filed Nov. 17, 2022, the entire contents of which are incorporated herein by reference.

TECHNICAL FIELD OF THE INVENTION

The invention relates to a gripping device for holding, centring and/or collet-clamping a micromechanical or horological component in a clamping chamber delimited by a collet comprising at least one movable jaw.

The invention further relates to a method for attaching such a micromechanical or horological component in the clamping chamber comprised in such a gripping device.

The invention relates to the field of micromechanics, the positioning and clamping of components during a manufacturing step, or the positioning and clamping of tools during a manufacturing step.

TECHNOLOGICAL BACKGROUND

The very precise positioning of micromechanical components, particularly horological components, in manufacturing tooling is always complicated. This need for precise positioning must be reconciled with adequate clamping, without inducing inappropriate deformation. The problem is similar when positioning and holding micro-tools used in manufacturing operations, which often requires perfect angular indexing.

Existing clamping means include many variants of Jacobs chucks, the collets whereof are resilient or articulated in order to hold the component. In particular, "Ottet" type collets are very commonly used in conventional clamping means in the horological industry. This type of clamp enables components to be clamped by opening or closing collet segments which deform resiliently, typically under the combined action, in an axial direction, of a screw-nut system, a resilient return means such as a spring, a push-piece such as a ball or the like bearing against this resilient return means, and a cone tapering inwards or outwards cooperating with sectors of conical or rounded profile which are comprised in the segments. These segments are intended to be machined, usually internally, so as to match, as much as possible, the contours of the component to be clamped, and can be machined in place in the machine for maximum precision. The collet itself is mounted on a pallet which can be clamped to/unclamped from an automatic clamping device typically fitted to the divider of a machining tool. The cone clamping principle of such a collet is described in the European patent document EP1602426B1.

However, as the segments must pivot in order to clamp the component, there is no fixed reference bearing point in space ensuring the height and location of the components. In other words, if a component is clamped with this type of collet, it is difficult to guarantee the precise axial and radial position thereof. If, for example, the component does not have exactly the same dimensions, or if the friction between the various segments and the clamping cone changes, the relative position of the component to the collet will change slightly. This problem is even greater for rework machining, which requires machining operations that are more localised compared to previous operations.

When a precision bearing point is required, this type of standard spring collet can generally no longer be used, as the space available in the centre of the clamp is reserved for the mechanical components transmitting the clamping/unclamping forces.

As a result, more customised solutions are generally required for these situations, which solutions are thus less flexible, have larger overall dimensions and are more expensive.

Another problem concerns the ability to hold, after a machining operation, a machined component that has been cut out of a blank component, which is the only piece that remains held in the collet.

It is again noted that, given the tendency towards miniaturising micromechanical machining tools, increasingly compact clamping means must be built, which means are able to guarantee all desired functions as well as the necessary stiffness and precision.

SUMMARY OF THE INVENTION

The purpose of the invention is to improve the positioning and clamping of a micromechanical or horological component or tool in a gripping device, by incorporating a precision reference bearing point therein, and a vacuum retaining point therein, complementary to conventional mechanical clamping, or replacing such clamping. For this purpose, the invention relates to a gripping device for holding, centring and/or clamping a micromechanical or horological component.

The present invention can thus overcome this problem of providing a fixed reference bearing point in space, by offering at least one fixed reference bearing point, and in particular by modifying a standard, commercially-available collet of a recognised and widespread model, which makes the manufacture of a gripping device according to the invention very cost-effective. Moreover, such a modification does not alter the external dimensions of the collet.

The problem of retaining a machined component cut out of a blank component held in a collet can be solved by using a gripper comprising vacuum retention means. However, a standard collet has no such system, and yet, after being cut out, such a machined component must be retained, the retention force applied to this machined component must be increased, and it must be held in position. This is because, after being cut out, the collet can continue to clamp the remaining part of the blank component; the machined component itself is no longer clamped, regardless of whether the collet is clamped tight or not.

The present invention also overcomes this problem and enables a vacuum to be applied to the component to be retained, also on the basis of a modified standard collet.

Another aspect of the invention relates to a method for attaching such a micromechanical or horological component inside the clamping chamber comprised in such a gripping device.

BRIEF DESCRIPTION OF THE FIGURES

The purposes, advantages and features of the invention will be better understood upon reading the following detailed description given with reference to the accompanying drawings, in which.

Figure 1:
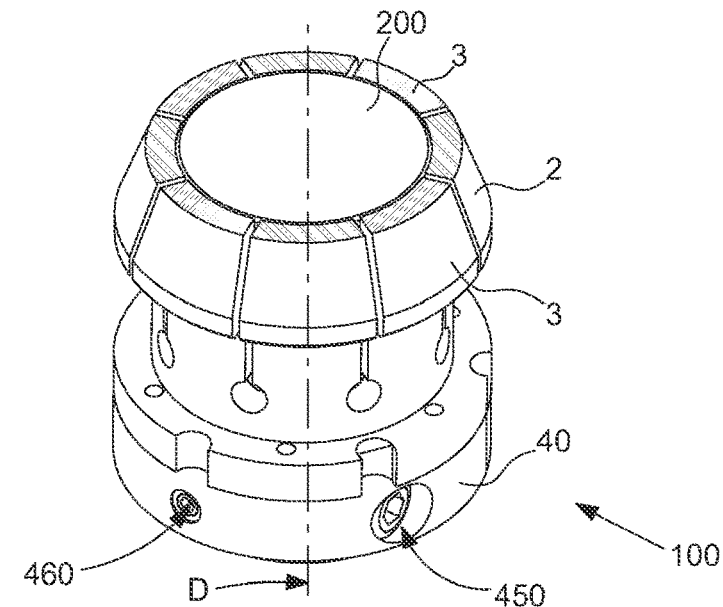
FIG. 1 diagrammatically shows a perspective view of a gripping device according to the invention, produced on the basis of a commercially-available spring collet comprising a plurality of jaws separated by slots; this spring collet is of the type with substantially concentric clamping about a collet axis; some of these jaws are machined internally so that they can no longer move when the spring collet is activated, and thus become stationary jaws, as opposed to the movable jaws, with which, in this non-limiting alternative embodiment, they are disposed alternately; this collet thus comprises both stationary jaws rigidly connected at a retaining plate and having no actuator cone, and movable jaws comprising actuator cones.
Figure 2:
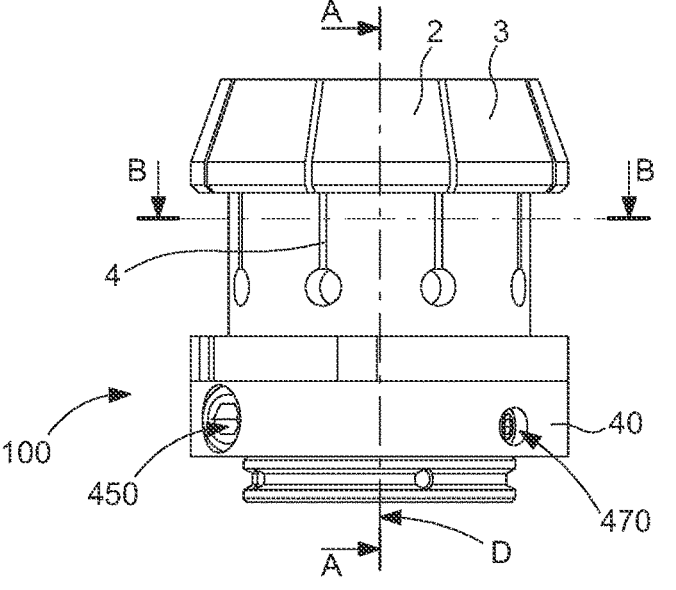
Figure 3:
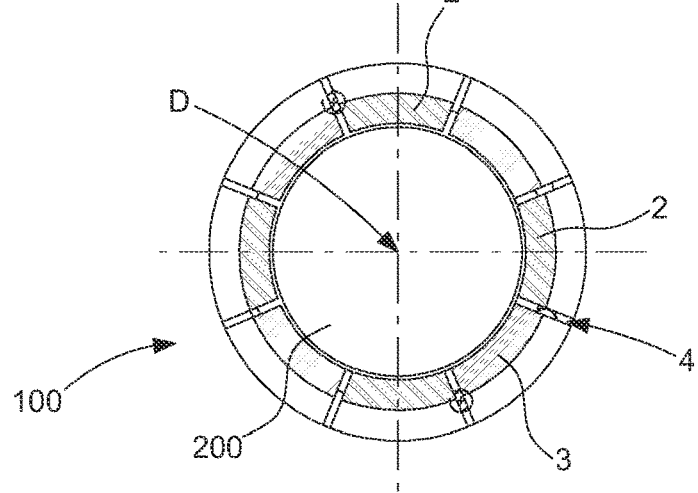
Figure 4:
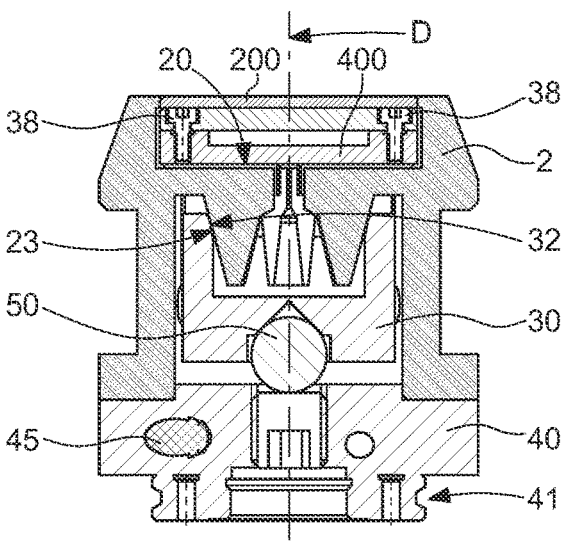
Figure 5:
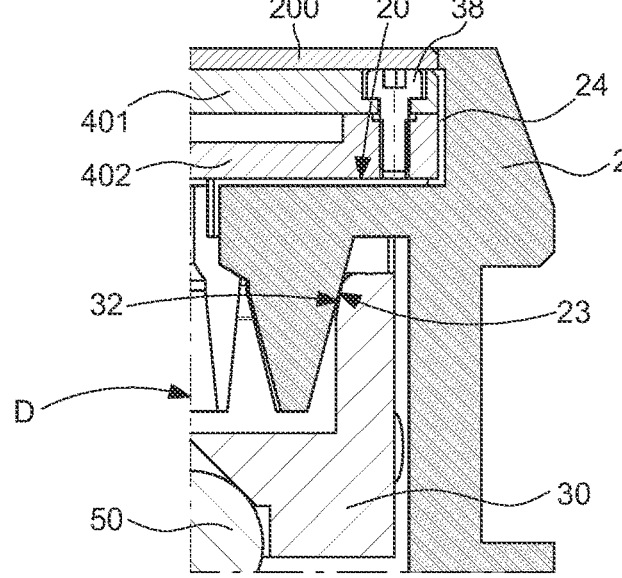
Figure 6:
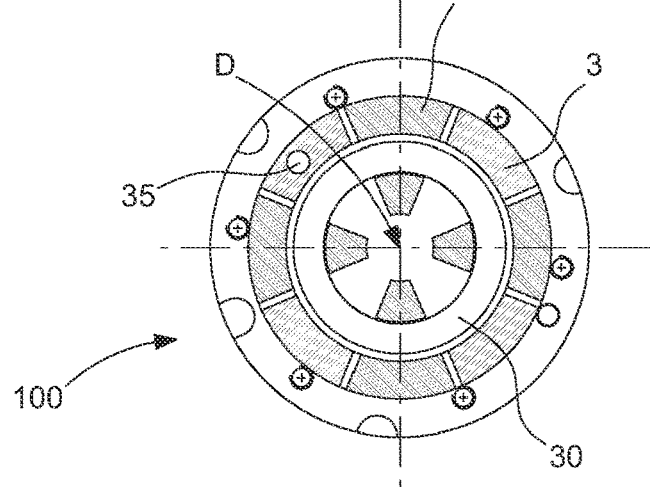
Figure 7:
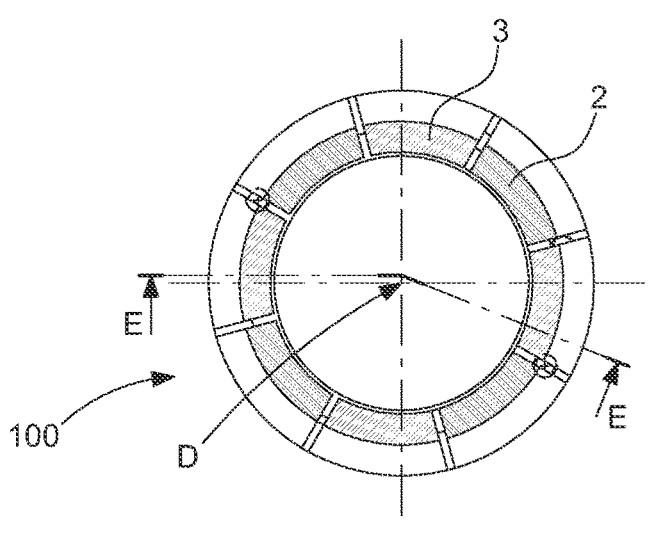
Figure 8:
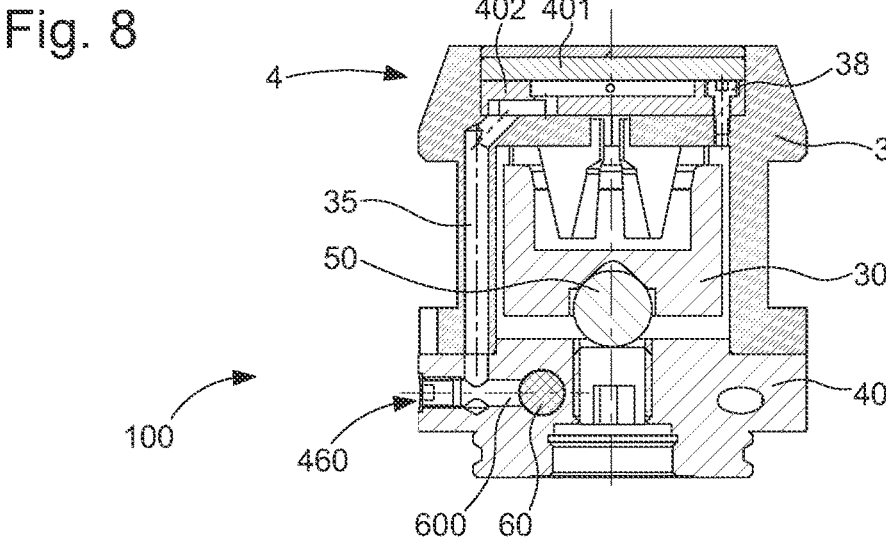
Figure 9:
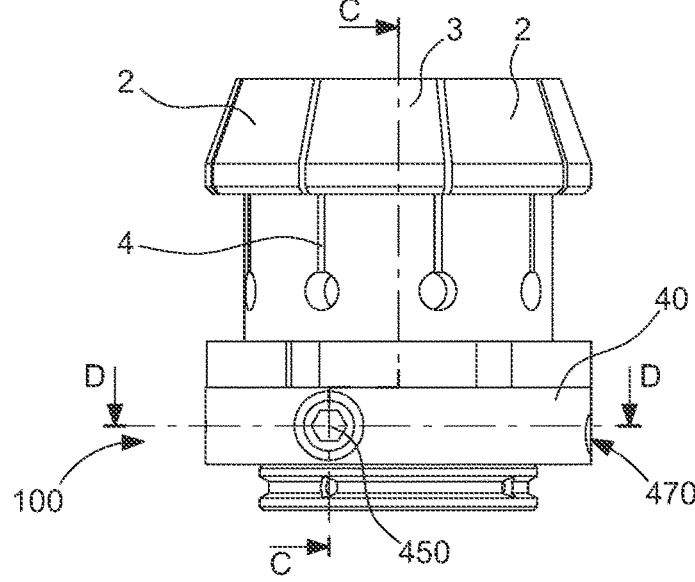

in this case, in a non-limiting manner, only one stationary jaw comprises a vacuum channel creating a vacuum in the clamping chamber;

FIG. 2 diagrammatically shows a side view of the gripping device in FIG. 1;

FIG. 3 diagrammatically shows a top view of the gripping device in FIG. 1;

FIG. 4 diagrammatically shows a sectional view, along the cutting plane A-A defined in FIG. 2, of the gripping device shown in FIG. 1; the arrangement in tiers, along the collet axis, starting from the lower end of the gripping device, is shown, in addition to a pallet with a standardised handling interface, in this case in the form of a groove, and the housing of a manoeuvring member (not shown), such as a screw or a rod, for pushing or pulling, passing therethrough, this pallet carrying a pushing member, in this case a ball placed on a spring (not shown), which is actuated by the manoeuvring member to push a cone, which is in this case tapering inwards, which cooperates with conical sectors comprised in the movable jaws. These movable jaws comprise a clearance that surrounds a retaining plate holding the stationary jaws, which are not shown in this sectional view, which plate carries the component to be positioned and clamped, this clearance allowing the movable jaws to be manoeuvred by pivoting in order to clamp the component; it is thus understood that the movable jaws are actuated by the actuation cone thereof when the clamping screw is operated; part of the venturi chamber can also be seen in the lower part of the pallet;

FIG. 5 shows a feature of FIG. 4 illustrating this clearance;

FIG. 6 diagrammatically shows a sectional view, along the cutting plane B-B in FIG. 2, of the gripping device in FIG. 1, illustrating the alternation of the stationary jaws with the movable jaws, of which only the conical sectors are visible in the central part, the stationary jaws having no actuating cones;

FIG. 7 shows, similarly to FIG. 3, the gripping device in FIG. 1 after the jaws have been pivoted;

FIG. 8 shows a cross-sectional view, along the cutting plane E-E in FIG. 7, of the gripping device in FIG. 1; the pallet can be seen to contain air flow channels, and a portion of a chamber housing the venturi which generates a vacuum; the upper ends of the movable jaws are arranged to support and clamp the component to be positioned and clamped; the figure shows the movable jaws and a channel of the vacuum circuit communicating with the suction zone created by the venturi visible in the lower part of the figure;

FIG. 9 shows, similarly to FIG. 2, the gripping device in FIG. 1 after the jaws have been pivoted;

FIG. 10 shows, similarly to FIG. 8, the gripping device in FIG. 1 in a sectional view along the cutting plane C-C in FIG. 9, and shows the venturi in its channel;

FIG. 11 shows a cross-sectional view, along the cutting plane D-D in FIG. 9, of the gripping device in FIG. 1, and shows the venturi in its channel, as well as the adjacent blowing and discharge channels;

FIG. 12 shows a cross-sectional view, along the cutting plane F-F in FIG. 11, of the gripping device in FIG. 1, and shows the blowing channel with its two blowing tracks, and part of the suction duct in one of the movable jaws;

FIG. 13 diagrammatically shows an exploded, side view of the basic components of a spring collet that can be used to produce a gripping device according to one of FIGS. 1 to 12, with a cone tapering inwards;

FIG. 14 diagrammatically shows an exploded, side view of the basic components of a spring collet that can be used to produce a gripping device according to another embodiment, with a cone tapering outwards; and FIG. 15 schematically shows an embodiment of the gripping device in which the actuating device is a rotatable ring.

DETAILED DESCRIPTION OF THE INVENTION

The invention relates to a gripping device 100 for holding, centring and/or collet-clamping a micromechanical or horological component 200 in a clamping chamber delimited by a collet 80 comprising at least one movable jaw 2.

More particularly, and in the non-limiting version illustrated by the figures, the invention relates to a gripper with a collet having substantially concentric jaws, distributed about a collet axis D; the principles of the invention which will be described hereinbelow are, however, applicable to other manufacturing tools, of the vice type, or to special tools with movable jaws.

In the non-limiting alternative embodiments illustrated in the figures, the invention is achieved by modifying commercially-available collets 80 (of the "Ottet" type or similar) in order to add a precision reference bearing point, and/or a vacuum retaining point with a high degree of compactness.

The reference bearing point allows the components to be clamped to be precisely positioned.

Retention using a vacuum offers a number of options, and in particular:

cutting out a machined component from a blank component clamped in a collet, while retaining, by vacuum, this machined component on an impression of the collet, while the rest of the blank component remains clamped in the collet;

increasing the retention force of the component against the bearing point;

retaining the component after unclamping and placing in an unclamped position, for example while waiting for an operator or robot to load/unload components.

The example shown concerns the use of a standard collet as a clamping base, with the low-cost modification of standard collets 80 of the "Ottet" type or similar.

This modified collet is intended to be assembled on a pallet 40 fitted with a standard interface 41 available from suppliers such as "Erowa", "Yerly", "TG-Colin" or others, so as to be interchangeable and equip any type of machine with this clamping means. In an alternative embodiment, this device can also be attached directly to any shank nose.

The components can be clamped/unclamped either manually, using a screw, from outside the machine, or automatically, for example and in a non-limiting manner, using a control rod with which the machine is fitted.

The device 100 comprises a cone 30, which is an element that allows the collet to be closed or opened respectively, depending on the inwards/outwards tapering thereof, as shown in FIG. 13 (cone tapering inwards) and 14 (cone tapering outwards).

In order to modify the standard collet used, the invention will divide the role of the collet segments, in this case consisting of movable jaws 2 and stationary jaws 3, into two distinct functions. In particular and in a non-limiting manner, in order to be balanced, half of the segments can be shared for each function; any other combination is possible depending on the restrictions specific to the manufacturing operation to be carried out.

The first function remains the basic function of a gripper, i.e. of clamping/unclamping the component 200, while ensuring that it is centred.

The second function consists of eliminating the clamping/unclamping movement, and of rigidly connecting and stiffening the segments by means of a common plate in order to provide a fixed reference bearing point. To eliminate this movement on certain desired segments, the cones that actuate these particular segments must first be eliminated/machined.

The movable jaws 2 allow the component 200 to be clamped/unclamped (first function), and the stationary jaws 3 rigidly connected to one another form the reference bearing point (second function).

The movable jaws 2 are actuated by the cooperation between, on the one hand, the control cone 30 tapering inwards or outwards, driven by a clamping screw 90 passing through the pallet 40 and arranged to push the pushing means 50, in particular a ball or a push-piece shuttle, which is combined with an axial resilient return means 51 such as a spring, this cone 30 comprising conical surfaces 32, and, on the other hand, complementary evolving surfaces 23, in particular conical surfaces comprised in the movable jaws 2 incorporated into the collet 80. It goes without saying that the conical surfaces of the cone 30 and of the jaws can be replaced by other surfaces with an evolving profile.

Thus, according to the invention, at least one movable jaw 2 or stationary jaw 3, or when the collet comprises a plurality of jaws, at least some of the movable jaws 2 and/or of the stationary jaws 3 of the collet 80, comprises a reference surface 20, which is arranged to support a component 200 directly bearing frontally thereagainst, and/or to support an intermediate retaining plate 400, 401, 402 directly bearing frontally thereagainst, against which this component 200 frontally bears.

Moreover, the gripping device 100 comprises both, on the one hand, stationary jaws 3 comprising the reference surface 20 and arranged to support a component 200 bearing thereagainst, and movable jaws 2 arranged to centre and/or clamp a component 200 and/or an intermediate retaining plate 400, 401, 402, and on the other hand at least one vacuum generator 60 arranged to create a vacuum inside the clamping chamber by way of at least one channel 35 made in the movable jaws 2 and/or stationary jaws 3.

More particularly, the gripping device 100 comprises movable jaws 2 arranged for centring and/or clamping a component 200 and/or an intermediate retaining plate 400, 401, 402, which bears against the reference surface 20 and acts as a support for a component 200 bearing thereagainst, and the movable jaws 2 comprise a recess 24 which is made around this intermediate retaining plate 400, 401, 402, to provide a gap allowing these movable jaws 2 to deform resiliently and move towards the collet axis D, in order to clamp the component 200.

More particularly, the gripping device 100 comprises stationary jaws 3 comprising the reference surface 20 and arranged to support a component 200 bearing thereagainst, and such movable jaws 2 arranged to centre and/or clamp a component 200 and/or an intermediate retaining plate 400, 401, 402, which bears against the reference surface 20 and acts as a support for a component 200 bearing thereagainst, and is arranged to hold the stationary jaws 3.

More particularly, the gripping device 100 comprises, aligned along a collet axis D, a pallet 40 comprising gripping means 41 arranged to cooperate with a tool and/or a handling device, and an actuating device arranged to control the opening or closing of the collet.

In one particular embodiment depicted in FIG. 15, this actuating device comprises a ring that rotates about the collet axis D to control closing of the collet by pushing on the movable jaws 2 comprised in the collet.

In another particular embodiment illustrated by FIGS. 1-14, the gripping device 100 comprises, along the collet axis D, through or around this pallet 40, a manoeuvring means 90, such as a screw, a nut, or a push or pull rod, for actuating pushing means 50 on a resilient support, and a cone 30 tapering inwards or outwards, comprising evolving surfaces 32, in particular conical surfaces, which are arranged to cooperate with complementary surfaces 23 comprised in the movable jaws 2 and/or the stationary jaws 3, and which constitute surfaces for actuating the collet 80.

More particularly again, only the movable jaws 2 comprise such complementary surfaces 23, which the stationary jaws 3 do not have when they are comprised in the gripping device 100.

The vacuum generator 60 more particularly comprises a venturi cartridge, which is positioned between an air blowing inlet circuit blowing air via at least one blowing track 471, 472, an air outlet circuit 460, and a suction zone 600 in which, when air is blown through the inlet, a vacuum is created and transmitted to the clamping chamber via this at least one channel 35.

Advantageously, the vacuum generator 60 comprises a venturi cartridge housed in a main orifice 450, and auxiliary orifices 460, 470, defining air circulation channels including at least one blowing channel 475 supplied by at least one blowing track 471, 472.

More particularly, it is the pallet 40 which comprises the vacuum generator 60 comprising a venturi cartridge housed in a channel 45 with a main orifice 450, and auxiliary orifices 460, 470, defining air circulation channels, including at least one blowing channel 475 supplied by at least one blowing track 471, 472; in a particular non-limiting embodiment, this at least one track and these orifices are limited by check valves 476 and/or plugs.

In another alternative embodiment, some of these orifices are kept open.

In one particular embodiment, the movable jaws 2 and the stationary jaws 3 are alternating. Generally speaking, the movable jaws 2 and stationary jaws 3 are separated in pairs by a slot 4.

More particularly, the movable jaws 2 on the one hand, and the stationary jaws 3 on the other, are rotationally symmetrical relative to the collet axis D.

More particularly, there is an equal number of movable jaws 2 and stationary jaws 3.

According to an alternative embodiment, the vacuum circuit, in order to remain simple to produce, is preferably made through at least one stationary jaw 3, or even through a single stationary jaw 3. The stationary jaws 3 easily channel the suction to the retaining plate. The movable jaws 2 pivot and deform, requiring a gap between them and the retaining plate, which makes it difficult to transmit suction. Preferably, the channel 35 is thus located through a stationary jaw 3 of the spring collet 80. The figures illustrate a non-limiting embodiment with a single channel 35 in a single stationary jaw 3, which channels the suction, and which appears to be sufficient if the venturi is correctly sized. It goes without saying that the suction could be easily distributed to a plurality of stationary jaws 3, for example by machining a circular groove in the base plate of the pallet 40, which can thus distribute suction to each stationary jaw 3.

A blowing pressure of between 4 and 6 bars at the blowing tracks 471 and 472 allows the desired vacuum to be achieved in the chamber, using a "FESTO" venturi of the type "VN-05-H" or "VN-05-L" in a housing measuring 6 mm in diameter.

The drawing shows a screw being used as a manual means for clamping/unclamping the collet. However, if the machine is equipped with a control rod that passes through the centre of the pallet, then the control rod can replace the screw to act as an automatic clamping/unclamping means if it is powerful enough.

The invention further relates to a method for attaching a micromechanical or horological component 200 in the clamping chamber of such a gripping device 100, according to which: the component 200 is disposed on the reference surface 20, either indirectly through an intermediate retaining plate 400, 401, 402, indexed by a screw 38 and/or pin 39 on at least one stationary jaw 3, or directly by bearing on orifices of a vacuum network emerging from the movable jaws 2 and/or stationary jaws 3 at this reference surface 20, then a first retaining point is created by vacuum, then a second retaining point having a torque greater than that of the first retaining point is created by pivoting the movable jaws 2.

It goes without saying that positional indexing, and in particular indexing the angular position of the component 200, can be achieved by any means, the simplest and least expensive being the pin; this pin can be on the stationary jaws 3, or on the retaining plate holding the stationary jaws 3. The figures illustrate the case where the pin 39 is attached inside the retaining plate, as the latter is itself pinned in the spring collet 80. In an alternative embodiment, if we are working with a standardised blank that has a reference such as a notch, for example, it may be advantageous to have an orientation in the stationary jaws; the retaining plate, which has a different vacuum indentation for each reference, can thus be changed without having to add a pin or without having to machine a drop in the indentation. The solution illustrated allows the machined component 200 to be taken up once it has been cut out, if the finished part needs to be reworked for example. This solution is more flexible and more precise (because the location of the pin and the vacuum impression are machined in the same operation). If the workpiece has a milled indexing face or a dihedral angle, the pin in the retaining plate, or an orienting counter-form machined directly into the retaining plate, can take over the indexing. It is understood that using a variety of intermediate retaining plates adapted to the manufacture of each type of component is less expensive than machining jaws, which is sometimes irreversible.

To take advantage of the suction to retain the component 200 by vacuum, the plate or one of its components 401, 402, or the impression/reference bearing point must simply be drilled through to join the suction zone 600.

More particularly, the gripping device 100 is equipped with at least one vacuum generator 60, a component 200, which is a blank, is held in the movable jaws 2 and/or stationary jaws 3, and a machined component is cut from this blank, which machined component is held by vacuum before being recovered by an operator or by a robotised manipulator.

In short, the invention allows for the cost-effective manufacture of a gripping device that guarantees both correct positioning of the component and correct clamping; in particular, it can be produced by modifying a recognised and widespread standard clamping means, such as an "Ottet" type collet or the like.

The invention improves machining accuracy, in particular for rework machining, because the reference bearing point allows for better positional repeatability.

The invention offers the possibility of taking advantage of the vacuum to carry out various functions: to completely cut out a machined component, to improve retention of the component, to retain a component with an unclamped collet.

The invention is easy to identify, thanks to the distinction between stationary and movable segments (with the absence of actuating cones and the rigid connection of the stationary segments by means of a retaining plate), the presence of a reference bearing point on the stationary segments, and the passage of a vacuum through the spring collets and available on the reference bearing point.

The compactness of the invention complies perfectly with the tendency towards miniaturising micromechanical machining means, with overall dimensions that precisely meet the dimensional requirements of today's micromachines, while incorporating additional functions.

The invention claimed is:

1. A gripping device for holding, centring, and/or collet-clamping a micromechanical or horological component in a clamping chamber delimited by a collet of the gripping device, wherein the collet comprises, distributed about a collet axis, a plurality of movable jaws and a plurality of stationary jaws,
    wherein at least some of said stationary jaws; each comprise a respective reference surface arranged to support either of:
        (i) a said component directly bearing frontally thereagainst, or
        (ii) an intermediate retaining plate directly bearing frontally thereagainst, against which intermediate retaining plate a said component frontally bears, and
    wherein said movable jaws are arranged to centre and/or clamp a said component, and/or are arranged to centre and/or clamp a said intermediate retaining plate, and
    wherein said gripping device comprises at least one vacuum generator arranged to create a vacuum in said clamping chamber via a respective channel made in at least one stationary jaw of said plurality of stationary jaws.

2. The gripping device according to claim 1, wherein said movable jaws each comprise a respective recess configured to provide a gap allowing said movable jaws to deform and move towards said collet axis (D), in order to clamp said component.

3. The gripping device according to claim 1, wherein said reference surfaces are arranged to support a said intermediate retaining plate which bears against said reference surfaces and acts as a support for a said component bearing thereagainst.

4. The gripping device according to claim 1, wherein said gripping device comprises, aligned along the collet axis (D), a pallet comprising gripping means arranged to cooperate with a tool and/or arranged to cooperate with a handling device, and wherein the gripping device comprises an actuating device arranged to control opening or closing of said movable jaws of said collet.

5. The gripping device according to claim 4, wherein said actuating device comprises a ring capable of rotating about said collet axis (D) to control the closing of said movable jaws of collet, by pushing on said movable jaws.

6. The gripping device according to claim 4, wherein said actuating device comprises pushing means on a resilient support, a cone tapering inwards or outwards, the cone comprising conical surfaces arranged to cooperate with complementary surfaces, and which conical surfaces constitute surfaces for actuating said collet.

7. The gripping device according to claim 6, wherein only said movable jaws comprise said complementary surfaces, which said stationary jaws do not have.

8. The gripping device according to claim 1, wherein said at least one vacuum generator comprises a venturi cartridge positioned between:

(a) an air blowing inlet circuit blowing air via at least one blowing track, and
   (b) a suction zone in which, when air is blown through the inlet circuit, a vacuum is created and transmitted to said clamping chamber via said at least one channel.

9. The gripping device according to claim 8, wherein said venturi cartridge is housed in a main orifice, and wherein the gripping device is provided with auxiliary orifices defining air circulation channels, the air circulation channels including at least one blowing channel supplied by said at least one blowing track.

10. The gripping device according to claim 9, wherein said gripping device comprises, aligned along the collet axis (D), a pallet comprising gripping means arranged to cooperate with a tool and/or arranged to cooperate with a handling device, and wherein said pallet comprises said at least one vacuum generator, said venturi cartridge, said main orifice, said auxiliary orifices, said at least one blowing channel, said at least one said blowing track, and check valves, said at least one blowing track and said orifices being capable of being limited by said check valves.

11. The gripping device according to claim 1, wherein said movable jaws and said stationary jaws are alternating.

12. The gripping device according to claim 11, wherein said movable jaws on the one hand, and said stationary jaws on the other, are rotationally symmetrical relative to said collet axis (D).

13. The gripping device according to claim 11, wherein there is an equal number of said movable jaws and said stationary jaws.

14. A method for attaching a micromechanical or horological component in the clamping chamber of the gripping device according to claim 1, the method comprising:

disposing said component is disposed on said reference surfaces, either:

(a) indirectly through an intermediate retaining plate, which intermediate retaining plate is indexed by a screw on a least one of the stationary jaws, and/or which intermediate retaining plate is indexed by a pin on at least one of the said stationary jaws, or (b) directly by the component bearing on orifices of a vacuum network emerging from at least one of the stationary jaws at said reference surface thereof, then creating the vacuum to cause retention,
   then pivoting the movable jaws to cause retention.

15. The attachment method according to claim 14, wherein said component, which is a blank, is held in said collet, and a machined component is cut from said blank, which machined component is held by the vacuum.

* * * * *